(12) United States Patent
Yoon et al.

(10) Patent No.: US 11,469,412 B2
(45) Date of Patent: Oct. 11, 2022

(54) ANODE FOR LITHIUM METAL BATTERY, MANUFACTURING METHOD OF THE SAME, LITHIUM METAL BATTERY INCLUDING THE SAME

(71) Applicant: LG CHEM, LTD., Seoul (KR)

(72) Inventors: Jong Keon Yoon, Daejeon (KR); Kyung Hwa Woo, Daejeon (KR); Hoejin Hah, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 177 days.

(21) Appl. No.: 16/400,340

(22) Filed: May 1, 2019

(65) Prior Publication Data

US 2019/0341603 A1    Nov. 7, 2019

(30) Foreign Application Priority Data

May 2, 2018    (KR) .................. 10-2018-0050701
Apr. 24, 2019    (KR) .................. 10-2019-0047989

(51) Int. Cl.
| | | |
|---|---|---|
| *H01M 4/139* | (2010.01) | |
| *H01M 4/66* | (2006.01) | |
| *H01M 4/62* | (2006.01) | |
| *H01M 10/0525* | (2010.01) | |
| *H01M 4/02* | (2006.01) | |

(52) U.S. Cl.
CPC .......... *H01M 4/139* (2013.01); *H01M 4/626* (2013.01); *H01M 4/661* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2004/0258997 A1 | 12/2004 | Utsugi et al. | |
| 2006/0127751 A1 | 6/2006 | Woo | |
| 2011/0177396 A1* | 7/2011 | Moriwaka | H01M 4/136 429/304 |
| 2014/0099537 A1* | 4/2014 | Kato | H01M 4/668 429/210 |
| 2015/0294802 A1* | 10/2015 | Kato | H01G 11/56 361/502 |

(Continued)

FOREIGN PATENT DOCUMENTS

| | | |
|---|---|---|
| JP | 2006-156365 A | 6/2006 |
| KR | 10-2002-0039824 A | 5/2002 |

(Continued)

*Primary Examiner* — Victoria H Lynch
(74) *Attorney, Agent, or Firm* — Morgan, Lewis & Bockius LLP

(57) ABSTRACT

A negative electrode for a lithium metal battery, a method of manufacturing the same, and a lithium metal battery including the same are provided.

Specifically, one embodiment of the present invention provides a negative electrode for a lithium metal battery, the negative electrode including: a negative electrode current collector; a primer layer including an epoxy resin and a Ag conductive filler, the primer layer disposed on one surface or both surfaces of the negative electrode current collector; and a lithium metal (Li-metal) thin film disposed on the primer layer.

14 Claims, 4 Drawing Sheets

(56) References Cited

U.S. PATENT DOCUMENTS

| | | | | |
|---|---|---|---|---|
| 2017/0237046 A1* | 8/2017 | Shindo | ................... | B29C 70/88 |
| | | | | 429/163 |
| 2019/0067680 A1* | 2/2019 | Ohsawa | ................ | H01M 4/625 |
| 2020/0203677 A1* | 6/2020 | Lee | ....................... | H01M 2/027 |
| 2020/0347278 A1* | 11/2020 | Sahouani | ............... | C09J 163/00 |

FOREIGN PATENT DOCUMENTS

| | | | |
|---|---|---|---|
| KR | 10-2004-0076855 A | 9/2004 |
| KR | 10-2006-0083171 A | 7/2006 |
| KR | 10-2015-0113661 A | 10/2015 |
| KR | 10-2017-0092229 A | 8/2017 |

* cited by examiner

ANODE FOR LITHIUM METAL BATTERY, MANUFACTURING METHOD OF THE SAME, LITHIUM METAL BATTERY INCLUDING THE SAME

BACKGROUND OF THE INVENTION (a) Field of the Invention

The present invention relates to a negative electrode for a lithium metal battery, a method of manufacturing the same, and a lithium metal battery including the same.

(b) Description of the Related Art

Lithium metal batteries have an advantage in that they have a very high theoretical energy capacity by applying a negative electrode active material made of a lithium metal (Li-metal) or a lithium alloy (Li-alloy) to a negative electrode.

However, one of the reasons why lithium metal batteries have not yet been commercialized is that problems are generated in a process and/or physical properties of a final product, regardless of how their negative electrodes are manufactured.

Specifically, due to high reactivity of a negative electrode active material, the negative electrode of the lithium metal battery is difficult to manufacture by a slurry coating method, and it needs to be manufactured by other methods such as rolling, deposition, electrolytic plating, etc.

Among them, the rolling method is widely used in the related art, rather than the deposition method requiring a high process cost or the electrolytic plating method having a probability of deposition of foreign substances as well as lithium during plating.

However, when the rolling method is used, adhesion between a negative electrode current collector and a negative electrode active material in the manufactured negative electrode is weak, and thus an electrolytic solution may penetrate between the negative electrode current collector and the negative electrode active material during operation of the battery, and a gap between the negative electrode current collector and the negative electrode active material may become larger according to a volume change of lithium which is the negative electrode active material. This may lead to an increase in ohmic resistance of the battery, which may adversely affect the performance of the battery.

Accordingly, it is necessary to improve the negative electrode of the lithium metal battery, taking into consideration the process cost, the contamination of foreign substances, and the physical properties (particularly adhesion) of the negative electrode finally obtained.

SUMMARY OF THE INVENTION

In one embodiment of the present invention, it is intended to reduce process costs, to minimize contamination of foreign substances, and to improve physical properties (e.g., adhesion and conductivity) of a lithium metal negative electrode finally obtained, and ultimately, to improve lifespan characteristics of a lithium metal battery including the lithium metal negative electrode by introducing a primer layer including an epoxy resin and a silver (Ag) conductive filler into the negative electrode of the lithium metal battery.

Specifically, one embodiment of the present invention provides a negative electrode for a lithium metal battery, the negative electrode including: a negative electrode current collector; a primer layer including an epoxy resin and a Ag conductive filler, the primer layer disposed on one surface or both surfaces of the negative electrode current collector; and a lithium metal (Li-metal) thin film disposed on the primer layer.

The negative electrode of one embodiment may have improved conductivity and adhesion between the negative electrode current collector and the negative electrode active material via the primer layer including the epoxy resin and the Ag conductive filler.

The negative electrode of one embodiment may be manufactured by a rolling process that entails low process costs and has a low probability of contamination of a foreign substance.

Owing to the improved adhesion and conductivity, the negative electrode of one embodiment may improve lifespan characteristics and output characteristics of the lithium metal battery, and may also contribute to realizing the lithium metal battery in the form of a solid-state battery.

DETAILED DESCRIPTION OF THE EMBODIMENTS

Figure 1A:
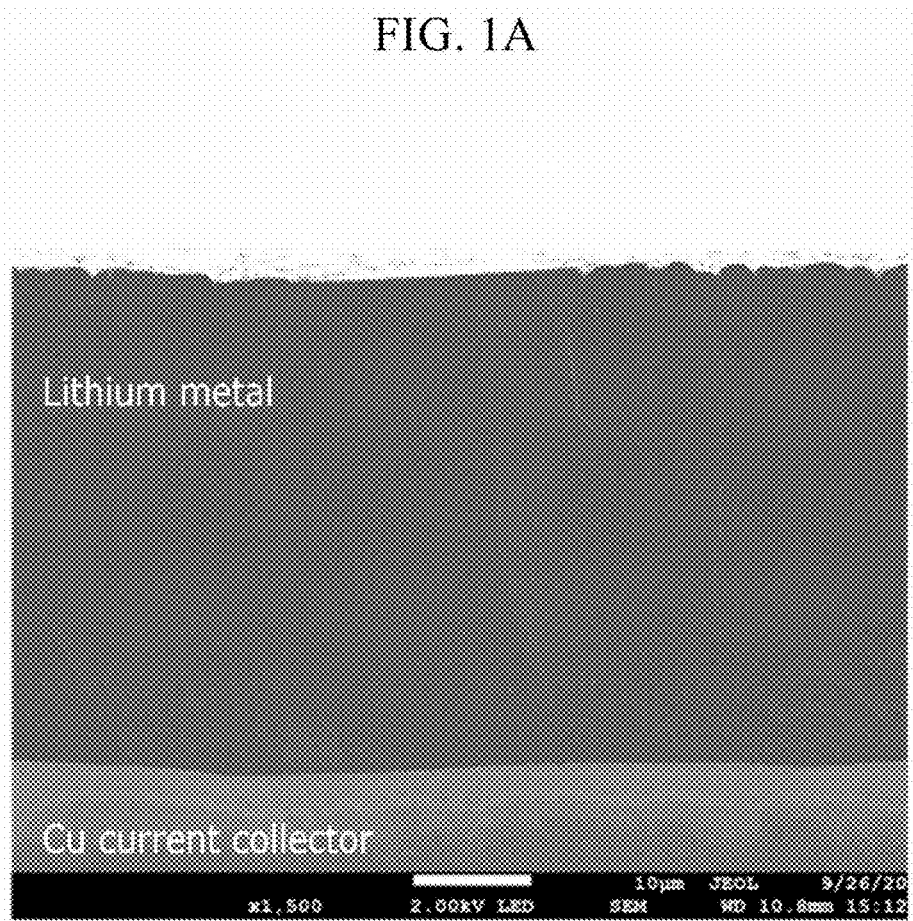
FIGS. 1a and 1b show SEM images of cross-sections of negative electrodes of Example 1 (FIG. 1A) and Comparative Example 1 (FIG. 1B), each negative electrode impregnated with an electrolytic solution and then washed.

In this specification, when a part is referred to as "including" an element, it will be understood that other elements may be further included rather than other elements being excluded unless content to the contrary is specially described. The terms "about", "substantially", or the like used throughout this specification have the meaning of proximity to the corresponding number when a specific allowable error for preparation or materials is defined, and are used in order to prevent an unscrupulous Infringer from unduly using the disclosure regarding an accurate or absolute number provided to help understanding of the present disclosure. In addition, throughout the specification, the term "step of ~" or "step for ~" does not mean "step for the purpose of ~".

Throughout the specification, the term "combination thereof" included as a Markush type denotes at least one mixture or combination selected from elements described as such Markush type, and means the inclusion of at least one selected from the group consisting of such elements.

Based on the above definitions, embodiments of the present invention will be described in detail. However, these are for illustrative purposes only, and the present invention is not limited thereby. The present invention will only be defined by the scope of the claims described below.

Negative Electrode for Lithium Metal Battery

In one embodiment of the present invention, a negative electrode for a lithium metal battery is provided, the negative electrode including: a negative electrode current collector; a primer layer including an epoxy resin and a Ag conductive filler, the primer layer disposed on one or both surfaces of the negative electrode current collector; and a lithium metal (Li-metal) thin film disposed on the primer layer.

This relates to a negative electrode of a lithium metal battery, wherein a pure lithium metal is used as a negative electrode active material, i.e., a lithium metal negative electrode.

Specifically, the lithium metal negative electrode of one embodiment may include the primer layer including the epoxy resin and the Ag conductive filler, thereby reducing process costs, minimizing contamination of foreign substances, and improving physical properties (e.g., adhesion and conductivity) of the lithium metal negative electrode finally obtained, and ultimately improving lifespan characteristics of a lithium metal battery including the lithium metal negative electrode.

1) More specifically, the primer layer may be interposed between the negative electrode current collector and the lithium metal thin film (i.e., a coated portion), thereby serving to adhere them together. For reference, the coated portion is a portion where the negative electrode current collector is coated with the negative electrode active material, and a non-coated portion is a portion where the negative electrode current collector is not coated with the negative electrode active material. An electrode tab is generally connected to the non-coated portion.

In the case of a common lithium metal negative electrode including no primer layer, adhesion between a negative electrode current collector and a lithium metal thin film becomes weak during operation of a lithium metal battery to which the lithium metal negative electrode is applied, and thus a gap is created therebetween, and foreign substances (particularly an electrolyte) may penetrate into the gap.

Generally, considering that contact resistance of metal-liquid or contact resistance of metal-liquid-metal is large, as compared with contact resistance of metal-metal, it is apparent that a contact resistance of a negative electrode current collector-electrolyte-lithium metal thin film is larger than contact resistance of a negative electrode current collector-lithium metal thin film, which may cause an increase in ohmic resistance of a lithium metal battery.

However, since the negative electrode of one embodiment may include the primer layer which is interposed between the negative electrode current collector and the negative electrode active material, the probability of penetration of foreign substances therebetween is low. In other words, in the lithium metal negative electrode including the primer layer, the contact between the negative electrode current collector and the lithium metal thin film may be tightly maintained, even if the operation cycle of the battery including the same is repeated, and the above problem may not be generated.

2) Particularly, since the epoxy resin included as one component of the primer layer is a material having excellent adhesion with respect to metals, the primer layer including the same may exhibit excellent adhesion with respect to the lithium metal thin film as well as to the negative electrode current collector.

Accordingly, the lithium metal negative electrode of one embodiment may have improved adhesion between the negative electrode current collector and the negative electrode active material (i.e., lithium metal thin film) via the primer layer including the epoxy resin.

In the lithium metal negative electrode having such excellent adhesion, the contact between the negative electrode current collector and the lithium metal thin film may be tightly maintained, and the above problem caused by penetration of an electrolyte into the gap between the negative electrode current collector and the lithium metal thin film may not be generated, even if the operation cycle of the battery including the same is repeated.

Further, the epoxy resin has no electrical insulation, and thus may not interfere with the conductivity of the lithium metal negative electrode, even though it is introduced as a component of the primer layer. However, when a polyimide having electrical insulation while having excellent adhesion is introduced as the component of the primer layer, the lithium metal negative electrode including the same is electrically insulative, and thus the lithium metal battery may not operate.

3) The other component included in the primer layer is silver (Ag) which is a conductive filler, and which exhibits remarkably high electrical conductivity as compared with other substances known as the conductive filler in the art.

Specifically, substances known as the conductive filler in the art and electrical conductivity thereof at 20° C. are as follows.

[Non-metal] silicon (Si): $1.56 \times 10^{-3}$ S/m; amorphous carbon: $1.25 \times 10^3$ to $2 \times 10^3$ S/m;

[Metal] platinum (Pt): $9.43 \times 10^6$ S/m; aluminum (Al): $3.77 \times 10^7$ S/m; nickel (Ni): $1.43 \times 10^7$ S/m; copper (Cu): $5.96 \times 10^7$ S/m; lead (Pb): $4.55 \times 10^6$ S/m; gold (Au): $4.1 \times 10^7$ S/m;

In contrast, silver (Ag) exhibits electrical conductivity of $6.30 \times 10^7$ S/m at 20° C. Therefore, use of silver (Ag) as the conductive filler included in the primer layer is advantageous in improving conductivity of the lithium metal negative electrode and reducing ohmic resistance of the lithium metal battery including the same, as compared with use of non-metals known as the conductive filler in the art and other metals.

Taken together, in one embodiment, 1) the primer layer is disposed between the negative electrode current collector and the negative electrode active material, 2) particularly, the epoxy resin having excellent adhesion is introduced as one component of the primer layer, thereby improving adhesion of the lithium metal negative electrode and ohmic voltage of the lithium metal battery including the same, and 3) the Ag conductive filler is introduced as the other component of the primer layer, thereby further improving the ohmic voltage of the lithium metal battery including the same, and ultimately, the lithium metal negative electrode may remarkably improve the lifespan of the lithium metal battery.

The lithium metal negative electrode of one embodiment is described in more detail below, and is manufactured based on a rolling process which entails low process costs and has a low probability of contamination of a foreign substance during the process, as compared with other general processes of manufacturing the lithium metal negative electrode (e.g., deposition, electrolytic plating, etc.).

Meanwhile, the contents of the epoxy resin and the Ag conductive filler in the primer layer are not particularly limited. However, according to the desired characteristics of the lithium metal negative electrode, the blending of the epoxy resin and the silver (Ag) may be controlled. For example, in the case where it is intended to improve the adhesion rather than the electrical conductivity, the content of the epoxy resin may be higher than the content of the silver (Ag). On the contrary, in the case where it is intended to improve the electrical conductivity rather than the adhesion, the content of the silver (Ag) may be higher than the content of the epoxy resin.

In examples described below, to increase the electrical conductivity of the lithium metal negative electrode and to remarkably reduce the ohmic resistance of the lithium metal battery, the content of silver (Ag) was higher than the content of the epoxy resin in the total weight of the primer layer. That is, as in the examples described below, to remarkably decrease the ohmic resistance of the lithium metal battery, the content of silver (Ag) is 50% by weight or more (but less than 100% by weight), and the content of the epoxy resin is the remainder, based on the total weight of the primer layer (100% by weight).

In the examples described below, for the purpose of securing appropriate adhesion of the lithium metal negative electrode, the content of silver (Ag) was 60% by weight or more to 7 5% by weight or less, and the content of the epoxy resin was the remainder, based on the total weight of the primer layer (100% by weight). However, these are for illustrative purposes only, and in terms of two aspects of electrical conductivity and adhesion, the epoxy resin and the silver (Ag) may be appropriately blended by controlling each content thereof.

In the primer layer, the silver (Ag) may be used as flake-shaped particles having a size of 100 nm or less (but more than 0 nm). However, this is for illustrative purposes only, and one embodiment is not limited thereto.

As the epoxy resin, an epoxy resin having a glass transition temperature (Tg) of 100° C. or more may be selected. In order to enhance adhesion between the negative electrode current collector and the lithium metal thin film via the primer layer, the lithium metal negative electrode of one embodiment may be manufactured by performing a process of heating at a temperature higher than room temperature, e.g., at 45° C. to 100° C. during the rolling process of manufacturing the lithium metal negative electrode of one embodiment or in a subsequent process.

In this regard, to prevent the epoxy resin from having flowability by heat, an epoxy resin having a higher glass transition temperature (Tg) than the heat treatment temperature may be selected. For example, poly[(phenyl glycidyl ether)-co-formaldehyde] having a glass transition temperature (Tg) of 100° C. or more may be used as the epoxy resin.

More detailed descriptions regarding the rolling process and the heat treatment will be given below.

A thickness of the primer layer may unconditionally be 0.5 µm to 3 µm, e.g., 1 µm to 2 µm, irrespective of a thickness of the negative electrode current collector, a thickness of the lithium metal thin film, etc. This range is advantageous in improving adhesion and securing conductivity, but one embodiment is not limited thereto.

Independently of the thickness of the primer layer, the thickness of the negative electrode current collector may be 6 µm to 20 µm, e.g., 10 µm to 12 µm. Further, independently of the thickness of the primer layer and the thickness of the negative electrode current collector, the thickness of the lithium metal thin film may be 8 µm to 40 µm, e.g., 10 µm to 40 µm. In this range, the thickness manufactured by the rolling process may be optimized, but one embodiment is not limited thereto.

The primer layer may be formed on one surface of the negative electrode current collector or on both surfaces thereof. In this regard, the negative electrode for a lithium metal battery of one embodiment may have a structure of negative electrode current collector/primer layer/lithium metal thin film in the former case, and may have a structure of lithium metal thin film/primer layer/negative electrode current collector/primer layer/lithium metal thin film in the latter case. When the primer layer is formed on both surfaces, there is an advantage in expanding the capacity of the battery cell, as compared with the case where the primer layer is formed on one surface. However, one embodiment is not limited thereto.

Method of Manufacturing Lithium Metal Negative Electrode

In another embodiment of the present invention, a method of manufacturing the negative electrode for a lithium metal battery is provided, the method including the steps of: applying a paste including the epoxy resin and the Ag conductive filler on one surface or both surfaces of the negative electrode current collector; and rolling the negative electrode current collector and the lithium metal (Li-metal) thin film between which the applied paste is interposed.

This method corresponds to a method of using the rolling process that entails low process costs, as compared with deposition, and has a low probability of contamination of a foreign substance, as compared with electrolytic plating.

Generally, a method of manufacturing a negative electrode of a lithium ion battery may be performed by applying and drying a slurry including a negative electrode active material, a binder, and a solvent onto a negative electrode current collector.

Unlike this, in a lithium metal battery, a negative electrode active material made of lithium metal (Li-metal) or a lithium alloy (Li-alloy) is employed. Due to high reactivity of the negative electrode active material, when the negative electrode is manufactured by applying a slurry as in the lithium ion battery, it is difficult to ensure safety of the process.

Although several methods such as deposition, electrolytic plating, rolling, etc. have been discussed as the method of manufacturing the negative electrode of the lithium metal battery, a method of entailing low process costs and having a low probability of contamination of a foreign substance is the rolling method.

However, when the negative electrode of the lithium metal battery is manufactured by laminating the thin film made of lithium metal (Li-metal) or a lithium alloy (Li-alloy) on the negative electrode current collector without using a binder, and then rolling the laminate using a roll-press, there is also a problem in that adhesion of the negative electrode is lowered.

Specifically, when the negative electrode current collector and the negative electrode active material are rolled without a binder, adhesion therebetween is weak, and thus an electrolyte penetrates into a gap therebetween, resulting in an increase of ohmic resistance, etc.

However, the method of forming the primer layer may be performed, based on the rolling method.

In particular, the paste including the epoxy resin and the Ag conductive filler is applied onto the negative electrode current collector, and then the lithium metal thin film is laminated thereon before the paste is dried, followed by rolling. Accordingly, the paste including the epoxy resin may be converted into the above-described primer layer, and as a result, the negative electrode current collector and the lithium metal thin film may be adhered to each other via the primer layer.

Specifically, during the rolling process, a part or all of the lower portion of the lithium metal thin film (a portion in contact with the paste of both surfaces of the lithium metal thin film) is melted, and the melted lithium is complexed with the epoxy resin in the paste to generate an anchoring effect, resulting in enhancement of adhesion.

Accordingly, the negative electrode for the lithium metal battery of one embodiment may have more enhanced adhesion due to a synergistic effect of the characteristic of the method of forming the primer layer (i.e., the anchoring effect by rolling) with the characteristic of the material included in the primer layer (i.e., adhesion of the epoxy resin with respect to metal).

As long as the anchoring effect by rolling is used, the negative electrode current collector having higher roughness is advantageous in improving the finally obtained negative electrode for the lithium metal battery, because it enhances the anchoring effect. However, this is for illustrative purposes only, and one embodiment of the present invention is not limited thereby.

For reference, as mentioned above, the lithium ion battery is generally manufactured by applying the slurry, not by rolling, and in this method it is difficult to achieve the anchoring effect. Furthermore, even though the negative electrode of the lithium ion battery is manufactured by the rolling process, a process temperature should be increased in order to achieve the anchoring effect, because the negative electrode active material (e.g., graphite, silicon, etc.) is stable at a high temperature, as compared with the lithium material, and there are problems such as waste of process costs, increase of product prices caused thereby, etc.

In the preparation of the lithium metal of one embodiment, the paste corresponds to a material for forming the primer layer. Accordingly, the paste may be prepared by determining a blending ratio of the epoxy resin and the silver and kinds of the materials, taking into consideration the composition, physical properties, etc. of the desired primer layer.

Specifically, when the paste is prepared, the content of the epoxy resin may be higher than the content of the silver (Ag) in the case where it is intended to improve the adhesion rather than the electrical conductivity, and on the contrary, the content of the silver (Ag) may be higher than the content of the epoxy resin in the case where it is intended to improve the electrical conductivity rather than the adhesion.

Particularly, as in examples described below, in the case where it is intended to remarkably reduce ohmic resistance of the lithium metal battery, the content of silver (Ag) may be 50% by weight or more (but less than 100% by weight), based on the total weight (100% by weight) of the paste.

Further, when heating is performed during the rolling process described below or in a subsequent process, an epoxy resin having a higher glass transition temperature (Tg) than the heating temperature may be used. For example, poly[(phenyl glycidyl ether)-co-formaldehyde] having a glass transition temperature (Tg) of 100° C. or more may be used.

As the paste, a commercially available conductive silver epoxy resin paste may also be used. The conductive silver epoxy paste may have a viscosity of 14,000 cPs to 20,400 cPs, as measured after stirring at 23° C. and 20 rpm, and a glass transition temperature (Tg) of 100° C. or more, and when meeting these conditions, workability may be excellent. However, these are for illustrative purposes only, and any commercially available conductive epoxy resin paste may be used in forming the primer layer without limitation.

The heating for the rolling may be performed at 25° C. to 100° C., specifically 45° C. to 100° C., e.g., 45° C. to 80° C. This range is advantageous in rapidly converting the paste including the epoxy resin and the Ag conductive filler into the primer layer, taking into consideration the fact that the above-described anchoring effect is accelerated at a temperature higher than room temperature. Further, since the temperature range corresponds to a temperature range of lower than the melting temperature (180.50° C.) of lithium and the glass transition temperature (100° C.) of the epoxy resin, the heating may not damage the lithium metal thin film and the adhesive layer. However, this is for illustrative purposes only, and one embodiment is not limited thereby.

Meanwhile, a pressure for the rolling may be sufficient when the lithium metal thin film is not damaged and no space is observed between the negative electrode current collector and the lithium metal thin film upon visual inspection after rolling, but is not particularly limited thereto.

Specifically, a pressure of 0.1 MPa to 10 MPa, 0.1 MPa to 9 MPa, 0.1 MPa to 8 MPa, 0.1 MPa to 7 MPa, 0.1 MPa to 6 MPa, 0.1 MPa to 5 MPa, 0.1 MPa to 4 MPa, 0.1 MPa to 3 MPa, 0.1 MPa to 2 MPa, e.g., 0.1 MPa to 1 MPa may be applied during the rolling, and the pressure range is advantageous in that the above-described anchoring effect may be achieved and adhesion between the negative electrode current collector and the lithium metal thin film may be improved. However, the pressure range may be appropriately selected while taking into consideration characteristics such as deformation of the manufactured negative electrode, cutting of the current collector, etc.

If necessary, a heat treatment process may be further included during or after the step of rolling the negative electrode current collector and the lithium metal (Li-metal) thin film between which the applied paste is interposed.

In other words, the step of heating the negative electrode current collector and the lithium metal (Li-metal) thin film between which the applied paste is interposed may be further included during or after the step of rolling the negative electrode current collector and the lithium metal (Li-metal) thin film between which the applied paste is interposed.

When the heat treatment is performed during or after rolling, it may be performed in a temperature range of 45° C. to 100° C., e.g., 45° C. to 80° C. The heating in this temperature range is advantageous in more rapidly converting the paste including the epoxy resin into the primer layer without damaging the lithium metal thin film. However, the above anchoring effect may be sufficiently achieved only by applying the pressure, even though the heating is not performed during or after rolling. Thus, the heat treatment is for illustrative purposes only, and one embodiment is not limited thereby.

Lithium Metal Battery

Still another embodiment of the present invention provides a lithium metal battery including: the above-described negative electrode; an electrolytic solution; and a positive electrode.

The lithium metal battery of one embodiment retains the above-described advantages of the negative electrode of one embodiment so that the lithium metal battery may have improved lifespan characteristics due to suppression of capacity reduction during operation.

A description regarding the negative electrode which is applied to the lithium metal battery of one embodiment is the same as above. Hereinafter, components other than the negative electrode of the battery will be described in more detail.

The electrolyte of the lithium metal battery may be a liquid electrolyte (i.e., an electrolytic solution) or a solid electrolyte.

When the electrolyte of the lithium metal battery is a liquid electrolyte, the electrolyte includes a non-aqueous organic solvent and a lithium salt.

The non-aqueous organic solvent serves as a medium for migration of ions involved in the electrochemical reaction of the battery.

The non-aqueous organic solvent may include a carbonate-based, ester-based, ether-based, ketone-based, or alcohol-based solvent, or an aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), etc., and the ester-based solvent may include methyl acetate, ethyl acetate, n-propyl acetate, 1,1-dimethylethyl acetate, methylpropionate, ethylpropionate, γ-butyrolactone, ecanolide, valerolactone, mevalonolactone, caprolactone, etc. The ether-based solvent may include dibutyl ether, tetraglyme, diglyme, dimethoxyethane, 2-methyltetrahydrofuran, tetrahydrofuran, etc., and the ketone-based solvent may include cyclohexanone, etc. The alcohol-based solvent may include ethyl alcohol, isopropyl alcohol, etc., the aprotic solvent may include nitriles such as R—CN (wherein R is a C2 to C20 linear, branched, or cyclic hydrocarbon group, and may include a double bond, an aromatic ring, or an ether bond), amides such as dimethylformamide, etc., dioxolanes such as 1,3-dioxolane, etc., sulfolanes, etc.

The non-aqueous organic solvent may be used alone or in a mixture of two or more thereof. When the solvent is used in a mixture of two or more thereof, its blending ratio may be appropriately controlled in accordance with a desired performance of a battery, which will be widely understood by those skilled in the art.

Further, the carbonate-based solvent may be preferably a mixture of a cyclic carbonate and a linear carbonate. In this regard, the cyclic carbonate and the linear carbonate are mixed together at a volume ratio of about 1:1 to about 1:9, which may enhance performance of the electrolytic solution.

In addition, the non-aqueous organic solvent may further include an aromatic hydrocarbon-based organic solvent, in addition to the carbonate-based solvent. In this regard, the carbonate-based solvent and the aromatic hydrocarbon-based organic solvent may be mixed at a volume ratio of about 1:1 to about 30:1.

The aromatic hydrocarbon-based organic solvent may be an aromatic hydrocarbon-based compound having the following Chemical Formula 1:

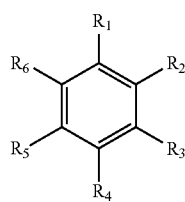

[Chemical Formula 1]

wherein, in Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 2 to improve the lifespan of the battery:

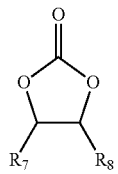

[Chemical Formula 2]

wherein, in Chemical Formula 2, $R_7$ and $R_8$ are each independently hydrogen, a halogen group, a cyano group (CN), a nitro group ($NO_2$), or a C1 to C5 fluoroalkyl group, provided that at least one of $R_7$ and $R_8$ is a halogen group, a cyano group (CN), a nitro group ($NO_2$), or a C1 to C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, etc. When the vinylene carbonate or the ethylene carbonate-based compound is further used, the amount thereof to be used may be appropriately controlled to improve the lifespan.

In the electrolytic solution of the lithium metal battery, the lithium salt may be dissolved in the organic solvent to act as a supply source of lithium ions, which allow basic operation of the lithium metal battery of one embodiment, and facilitate the movement of lithium ions between the positive electrode and the negative electrode.

The lithium salt may be a general lithium salt that is widely used in electrolytic solutions. For example, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$ (lithium bis(oxalato) borate; LiBOB), or a combination thereof may be used, but is not limited thereto.

Further, in the electrolytic solution, a concentration of the lithium salt may be controlled in the range of about 0.1 M to about 5.0 M. Within this range, the electrolytic solution may have appropriate conductivity and viscosity, and lithium ions may effectively migrate in the lithium metal battery of one embodiment. However, this is for illustrative purposes only, and the present invention is not limited thereto.

The electrolytic solution may be in the form of being impregnated into a porous separator which is positioned between the negative electrode and the positive electrode. Here, the porous separator may separate the negative electrode and the positive electrode and may provide a path through which lithium ions pass. Those commonly used in lithium batteries may be used. In other words, a porous separator having low resistance to migration of ions in an electrolyte and a high electrolyte-retaining ability may be used.

For example, the porous separator may be selected from a glass fiber, polyester, Teflon, polyethylene, polypropylene, polytetrafluoroethylene (PTFE), and a combination thereof, each of which may be a nonwoven fabric or a woven fabric. For example, a polyolefin-based polymer separator such as polyethylene, polypropylene, etc. may be mainly used in a lithium ion battery. A separator coated with a ceramic component or a polymeric material may be used to secure heat resistance or mechanical strength. Optionally, the separator may have a single layer or may have multiple layers.

Unlike this, when the electrolyte of the lithium metal battery is a solid electrolyte, the solid electrolyte applicable is not particularly limited.

Regardless of the electrolyte of the lithium metal battery, the positive electrode may include a positive electrode current collector and a positive electrode mixture layer disposed on the positive electrode current collector.

The positive electrode may be manufactured by mixing an active material and a binder, and if necessary, a conductive material, a filler, etc. in a solvent to prepare an electrode mixture in a slurry form, and then applying the electrode mixture onto the positive electrode current collector. This method of manufacturing the electrode is widely known in the art, and a detailed description thereof will be omitted.

The positive electrode active material is not particularly limited, as long as it enables reversible intercalation and deintercalation of lithium ions. For example, the positive electrode active material may include a composite oxide of a metal such as cobalt, manganese, nickel, or a combination thereof; and lithium.

More specifically, the positive electrode active material may be, for example, any one of compounds represented by the following chemical formulae: $Li_aA_{1-b}R_bD_2$ (wherein $0.90 \le a \le 1.8$ and $0 \le b \le 0.5$); $Li_aE_{1-b}R_bO_{2-c}D_c$ (wherein $0.90 \le a \le 1.8$, $0 \le b \le 0.5$, and $0 \le c \le 0.05$); $LiE_{2-b}R_bO_{4-c}D_c$ (wherein $0 \le b \le 0.5$ and $0 \le c \le 0.05$); $Li_aNi_{1-b-c}Co_bR_cD_\alpha$ (wherein $0.90 \le a \le 1.8$, $0 \le b \le 0.5$, $0 \le c \le 0.05$, and $0 < \alpha \le 2$); $Li_aNi_{1-b-c}Co_bR_cO_{2-\alpha}Z_\alpha$ (wherein $0.90 \le a \le 1.8$, $0 \le b \le 0.5$, $0 \le c \le 0.05$, and $0 < \alpha < 2$); $Li_aNi_{1-b-c}Co_bR_cO_{2-\alpha}Z_2$ (wherein $0.90 \le a \le 1.8$, $0 \le b \le 0.5$, $0 \le c \le 0.05$, and $0 < \alpha < 2$); $Li_aNi_{1-b-c}Mn_bR_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bR_cO_{2-\alpha}Z_\alpha$ (wherein $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}Z_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dG_eO_2$ (wherein $0.90 \le a \le 1.8$, $0 \le b \le 0.9$, $0 \le c \le 0.5$, $0 \le d \le 0.5$, and $0 \le e \le 0.1$); $Li_aNiG_bO_2$ (wherein $0.90 \le a \le 1.8$ and $0.001 \le b \le 0.1$); $Li_aCoG_bO_2$ (wherein $0.90 \le a \le 1.8$ and $0.001 \le b \le 0.1$); $Li_aMnG_bO_2$ (wherein $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the above Chemical Formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The compound may have a coating layer on the surface thereof, or may be mixed with another compound having a coating layer. The coating layer may include, as a coating element compound, an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. A method of forming the coating layer may be any coating method (e.g., spray coating, dipping, etc.) using the compounds and the elements as long as it has no adverse influence on physical properties of the positive electrode active material. A detailed description thereof will be omitted, since it is well-known to those of ordinary skill in the art.

The positive electrode current collector is generally fabricated in a thickness of 3 μm to 500 μm. The positive electrode current collector is not particularly limited, as long as it has high conductivity without causing chemical changes in the corresponding battery. For example, stainless steel, aluminum, nickel, titanium, sintered carbon, or aluminum or stainless steel that is surface-treated with carbon, nickel, titanium, or silver, etc. may be used. The current collector may also be processed to form fine irregularities on the surface thereof so as to enhance adhesion of the positive electrode active material. The current collector may be used in various forms including films, sheets, foils, nets, porous structures, foams, non-woven fabrics, etc.

The conductive material is not particularly limited, as long as it has conductivity without causing chemical changes in the corresponding battery. For example, the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; carbon fluoride; metallic powders such as aluminum or nickel powder, etc.; conductive whiskers such as zinc oxide, potassium titanate, etc.; conductive metal oxides such as titanium oxide, etc.; polyphenylene derivatives, etc.

The lithium metal battery of one embodiment may be used as a unit cell which is used as a power source of small devices and also used as a unit battery in a med-large battery module including a plurality of battery cells. Furthermore, a battery pack including the battery module may be configured.

Hereinafter, preferred examples of the present invention, comparative examples thereof, and experimental examples for evaluating the same will be described. However, the following examples are only exemplary embodiments of the present invention, and the present invention is not limited to the following examples.

Example 1 (Manufacture of Lithium Metal
Negative Electrode Including Primer Layer and
Components of Primer Layer: Epoxy Resin and Ag
Conductive Filler)

A commercially available conductive silver epoxy paste (product name: EPO-TEK H21D) was evenly applied at a thickness of about 1 μm on a circular copper current collector (thickness: 10 μm) with a cross-sectional area of 1.76 cm$^2$.

For reference, the conductive silver epoxy paste was prepared by mixing the following A and B reagents and stirring the mixture at a speed of 20 rpm such that it had a viscosity of 14,000 cPs to 20,400 cPs.

An A reagent including 60-75 wt % of silver flakes (particle size of <100 nm, CAS No. 7440-22-4) and the remainder of poly[(phenyl glycidyl ether)-co-formaldehyde] (CAS No. 28064-14-4, Tg: about 100° C.) which is a kind of bisphenol F; and a B reagent including 60-75 wt % of silver flakes (particle size of <100 nm, CAS No. 7440-22-4) and the remainder of substituted imidazole Before the applied paste was dried, it was covered by a lithium foil (Li foil) having a thickness of 40 μm, and then roll-pressed at a pressure of 1 MPa at room temperature, and finally heated in a vacuum oven at 80° C. for 1 h, thereby converting the paste between the copper current collector and the lithium foil into a fully solidified primer layer.

Example 2 (Manufacture of Lithium Metal Battery Including Lithium Metal Negative Electrode of Example 1)

$LiNi_{0.8}Mn_{0.1}Co_{0.1}O_2$ as a positive electrode active material, carbon black as a conductive material, and polyvinylidene fluoride (PVDF) as a binder were mixed at a weight ratio of positive electrode active material conductive material:binder of 94:2:4. To this mixture, NMP as a solvent may be added to prepare a slurry of the positive electrode active material.

The slurry of the positive electrode active material was applied onto one surface of an aluminum current collector at a thickness of 79 μm, and dried and rolled then punched to a predetermined size to manufacture a positive electrode.

A separator (polypropylene-based porous polymer substrate) was interposed between the negative electrode of Example 1 and the positive electrode, thereby manufacturing a coin cell. An electrolytic solution prepared by dissolving 1 M $LiPF_6$ in a mixed solvent of fluoroethylene carbonate (FEC) and ethyl methyl carbonate (EMC) at a volume ratio of 30:70 was injected into the coin cell, thereby manufacturing a lithium metal secondary battery.

Comparative Example 1 (Manufacture of Common Lithium Metal Negative Electrode Including No Primer Layer)

A circular copper current collector (thickness: 20 μm) with a cross-sectional area of 1.76 $cm^2$ was covered by a lithium foil (Li foil) having a thickness of about 40 μm, and then rolled by a roll press at room temperature and a pressure of 1 MPa, thereby manufacturing a negative electrode.

Comparative Example 2 (Manufacture of Lithium Metal Battery Including Lithium Metal Negative Electrode of Comparative Example 1)

A lithium metal battery was manufactured in the same manner as in Example 2, except that the negative electrode of Comparative Example 1 was used instead of the negative electrode of Example 1.

Comparative Example 3 (Manufacture of Lithium Metal Negative Electrode Including Primer Layer and Components of Primer Layer: Carbon)

A product in which a carbon primer layer was formed on both surfaces of a copper current collector was purchased (manufactured by Showa Denko, thickness of Cu current collector: 10 μm, thickness of carbon primer layer: about 1 μm), and cut in the same size as in Example 1. The carbon primer layer of the copper current collector was covered by a lithium foil (Li foil) having a thickness of about 40 μm, and then rolled by a roll press at room temperature and a pressure of 1 MPa, and finally heated in a vacuum oven at 80° C. for 1 h.

Comparative Example 4 (Manufacture of Lithium Metal Battery Including Lithium Metal Negative Electrode of Comparative Example 1)

A lithium metal battery was manufactured in the same manner as in Example 2, except that the negative electrode of Comparative Example 3 was used instead of the negative electrode of Example 1.

Experimental Example 1 (Evaluation of Adhesion of Lithium Metal Negative Electrode)

The lithium metal negative electrode of Example 1 and the lithium metal negative electrode of Comparative Example 1 were immersed in an electrolytic solution [$LiPF_6$ 1M in FEC/EC/EMC=5/25/70 (v/v/v)+VC 0.5 wt %] for 24 hours, respectively. Each of the lithium metal negative electrodes was taken from the electrolytic solution and washed. Then, cross-sections were created by ion milling and observed by SEM, respectively (FIGS. 1a and 1b).

Figure 1B:
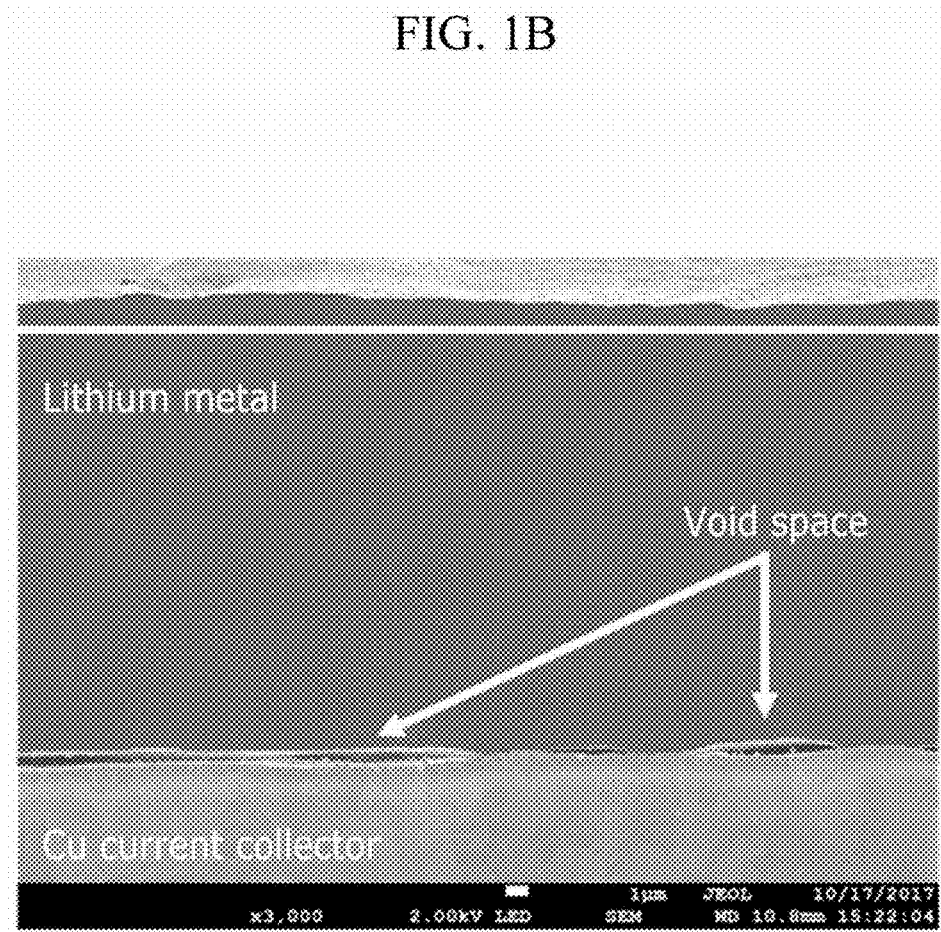

Referring to FIGS. 1a and 1b, since the lithium metal negative electrode of Example 1 (FIG. 1A) was further provided with the primer layer, as compared with that of Comparative Example 1 (FIG. 1b), adhesion between the negative electrode current collector and the lithium metal thin film was confirmed to be improved.

Particularly, it is inferred that the adhesion improvement is attributed to the components of the primer layer of Example 1 and the method of forming the primer layer.

Of the components of the primer layer of Example 1, the epoxy resin is a material having excellent adhesion, and thus the negative electrode current collector and the negative electrode active material (i.e., the lithium metal thin film) between which the epoxy resin is interposed may have improved adhesion.

Further, during the rolling process of forming the primer layer of Example 1, part or all of the lower portion of the lithium metal thin film (a portion in contact with the paste of the both surfaces of the lithium metal thin film) is melted, and the melted lithium is complexed with the epoxy resin in the paste to generate an anchoring effect, resulting in enhancement of adhesion.

Practically, it was found that when the primer layer including the epoxy resin was not introduced between the negative electrode current collector and the lithium metal thin film (FIG. 1b, Comparative Example 1), the electrolytic solution penetrated between the negative electrode current collector and the lithium metal thin film to create a gap (void space).

Unlike this, it was found that when the primer layer including the epoxy resin was introduced between the negative electrode current collector and the lithium metal thin film (FIG. 1a, Example 1), penetration of the electrolytic solution between the negative electrode current collector and the lithium metal thin film was inhibited to create no gap (void space).

Experimental Example 2 (Evaluation of Ohmic Voltage of Lithium Metal Battery)

Ohmic voltages of the lithium metal batteries of Example 2 and Comparative Examples 2 and 4 were evaluated by electrochemical impedance spectroscopy (EIS).

In detail, electrochemical impedance was measured under conditions of an amplitude of 10 Mv and a frequency scan range of 500 Khz to 20 MHz at room temperature using an impedance analyzer (VMP3, Bio-Logic Science Instruments). Based on the measurement results, a Nyquist plot of FIG. 2 was plotted and ohmic resistance was determined from FIG. 2, and shown in Table 1.

TABLE 1

|  | Comparative Example 2 | Comparative Example 4 | Example 2 |
|---|---|---|---|
| Ohmic resistance | 0.216 ohms | 0.202 ohms | 0.162 ohms |

Figure 2:
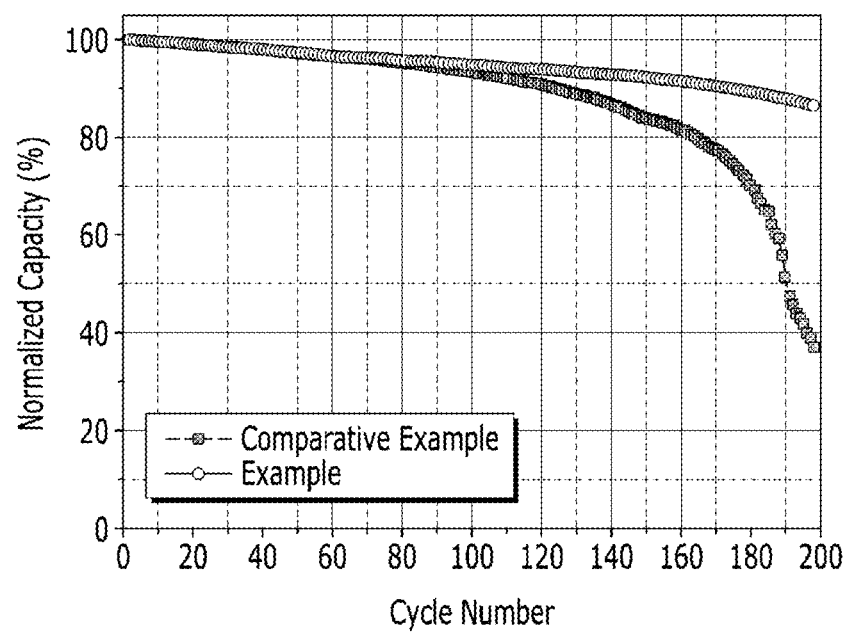
FIG. 2 shows results of evaluating ohmic voltages of lithium metal batteries of Example 2 and Comparative Example 2.

According to Table 1 and FIG. 2, ohmic resistance of the lithium metal battery of Example 2 was decreased, and thus an ohmic voltage was decreased, as compared with that of the lithium metal batteries of Comparative Examples 2 and 4.

The improvement of the ohmic voltage of the lithium metal battery of Example 2 is also associated with the adhesion which was confirmed in Experimental Example 1.

In detail, during operation of the lithium metal battery (Comparative Example 2) to which the lithium metal negative electrode (Comparative Example 1) including no primer layer was applied, the gap between the negative electrode current collector and the lithium metal thin film may be gradually enlarged, and thus the electrolyte may penetrate therebetween. The electrolyte that penetrated into the gap between the negative electrode current collector and the lithium metal thin film may cause an increase of the ohmic resistance of the lithium metal battery, as described above.

However, although operation cycles of the battery (Example 2) to which the lithium metal negative electrode (Example 1) including the primer layer was applied were repeated, the contact between the negative electrode current collector and the lithium metal thin film may be tightly maintained, and the problem as above may not occur.

Moreover, the improvement of the ohmic voltage of the lithium metal battery of Example 2 was more remarkably increased by silver (Ag) which is a conductive component.

Meanwhile, Comparative Example 3 (i.e., the negative electrode of the lithium metal battery of Comparative Example 4) includes the primer layer, and a component of the primer layer was a conductive carbon. However, there are limitations in that the conductivity of carbon is much lower than that of silver (Ag) at the same temperature, and components showing adhesion (e.g., epoxy resin, etc.), other than carbon, were not included. Therefore, the lithium metal battery of Comparative Example 4 showed an equivalent ohmic voltage to that of the battery of Comparative Example 2 including no primer layer in the negative electrode.

Experimental Example 3 (Evaluation of Electrochemical Characteristics of Lithium Metal Battery)

Charge/discharge cycle was performed for the lithium metal batteries of Example 2 and Comparative Examples 2 and 4 under the following conditions, respectively. Capacity characteristics after 30 cycles and 90 cycles, relative to the initial capacity, were evaluated. The evaluation results are recorded in Table 2 below and shown in FIG. 3.
Charge: 0.1 C, CC/CV, 4.25 V, 1/20C cut-off
Discharge: 0.5 C, CC, 3.0 V, cut-off

TABLE 2

|  | Capacity retention ratio (%) | |
|---|---|---|
|  | @ 80$^{th}$ | @ 160$^{th}$ |
| Example 2 | 95.3 | 94.6 |
| Comparative Example 4 | 80.4 | 88.0 |
| Comparative Example 2 | 81.6 | 89.8 |

Figure 3:
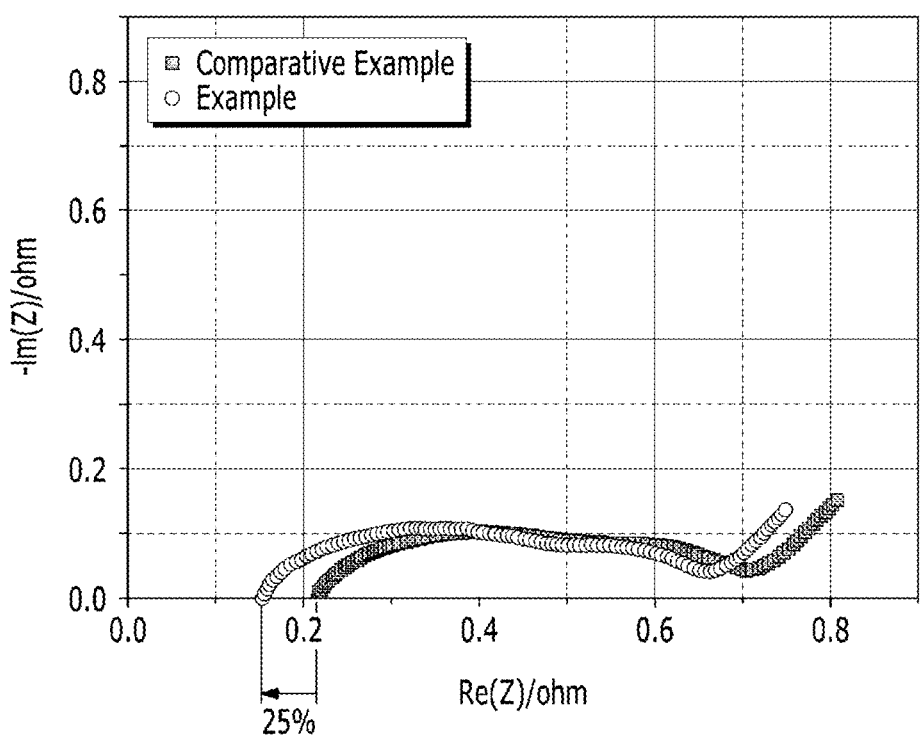
FIG. 3 shows results of evaluating charge/discharge cycles of the lithium metal batteries of Example 2 and Comparative Example 2.

According to Table 2 and FIG. 3, the capacity retention ratio of the lithium metal battery of Example 2 was remarkably higher than those of the lithium metal batteries of Comparative Examples 2 and 4, after the same number of charge/discharge cycles.

Through these results and the results of Experimental Examples 1 and 2 taken together, it can be seen that adhesion of the lithium metal negative electrode and ohmic voltage of the lithium metal battery ultimately affect the lifespan characteristics of the battery.

In particular, it should be noted that Comparative Example 3 (i.e., the negative electrode of the lithium metal battery of Comparative Example 4) including no epoxy resin to have low adhesion and including carbon having lower electrical conductivity than silver (Ag) as components of the primer layer of the lithium metal negative electrode may exhibit a lower capacity retention ratio than the lithium metal battery (Comparative Example 2) including no primer layer.

In other words, as the components of the primer layer of the lithium metal negative electrode, only when the epoxy resin having adhesion is provided together with silver (Ag) having remarkably high electrical conductivity, the lithium metal negative electrode may exhibit excellent adhesion and the lithium metal battery including the same may exhibit improved conductivity, and ultimately, lifespan characteristics of the lithium metal battery may be remarkably improved.

What is claimed is:

1. A negative electrode for a lithium metal battery, comprising:
   a negative electrode current collector;
   a primer layer including
      60 wt % to 75 wt % of a Ag conductive filler including flake-shaped particles having a size of 100 nm or less, based on a total weight of the primer layer (100% by weight), and
      a remainder being an epoxy resin having a glass transition temperature (Tg) of 100° C. or more; and
   a lithium metal (Li-metal) thin film disposed on the primer layer,
   wherein the primer layer is directly disposed on one surface or both surfaces of the negative electrode current collector, and excludes a conductive carbon, and
   the Li-metal thin film and the primer layer are adjacent to each other.

2. The negative electrode for the lithium metal battery of claim 1, wherein the primer layer has a thickness of 0.5 μm to 3 μm.

3. The negative electrode for the lithium metal battery of claim 1, wherein the negative electrode current collector includes lithium or copper.

4. A method of manufacturing the negative electrode for a lithium metal battery according to claim 1, the method comprising the steps of:

applying a paste including the epoxy resin and the Ag conductive filler directly on one surface or both surfaces of the negative electrode current collector to form the primer layer; and rolling the negative electrode current collector and the lithium metal (Li-metal) thin film between which the applied paste is interposed.

5. The method of claim 4, wherein in the step of rolling the negative electrode current collector and the lithium metal (Li-metal) thin film between which the applied paste is interposed, the rolling is performed by applying a pressure of 0.1 MPa to 10 MPa.

6. The method of claim 4, further comprising a step of heating the applied paste and the negative electrode current collector and the lithium metal (Li-metal) thin film between which the applied paste is interposed during or after the step of rolling the negative electrode current collector and the lithium metal (Li-metal) thin film between which the applied paste is interposed.

7. The method of claim 6, wherein the primer layer is formed on both surfaces of the negative electrode current collector.

8. The method of claim 6, wherein the epoxy resin comprises poly [(phenyl glycidyl ether)-co-formaldehyde].

9. The method of claim 4, wherein a step of heating the applied paste and the negative electrode current collector and the lithium metal (Li-metal) thin film between which the applied paste is interposed is performed at a lower temperature than a glass transition temperature (Tg) of the epoxy resin in the applied paste.

10. The method of claim 4, wherein a step of heating the applied paste and the negative electrode current collector and the lithium metal (Li-metal) thin film between which the applied paste is interposed is performed in a temperature range of 45° C. to 100° C.

11. A lithium metal battery, comprising:
the negative electrode of claim 1;
an electrolyte; and
a positive electrode.

12. The negative electrode for the lithium metal battery of claim 1, wherein the primer layer is formed on both surfaces of the negative electrode current collector.

13. The negative electrode for the lithium metal battery of claim 1, wherein the epoxy resin comprises poly [(phenyl glycidyl ether)-co-formaldehyde].

14. The negative electrode for the lithium metal battery of claim 1, wherein the primer layer is directly disposed on both surfaces of the negative electrode current collector.

* * * * *